United States Patent
Elsbernd et al.

(10) Patent No.: US 7,750,093 B2
(45) Date of Patent: Jul. 6, 2010

(54) POLYURETHANES DERIVED FROM OLIGOMERIC FLUOROACRYLATES

(75) Inventors: Cheryl L. S. Elsbernd, Woodbury, MN (US); Frans A. Audenaert, Kaprijke (BE); John C. Clark, White Bear Lake, MN (US); Chetan P. Jariwala, Woodbury, MN (US); George G. I. Moore, Afton, MN (US); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 798 days.

(21) Appl. No.: 11/478,219

(22) Filed: Jun. 29, 2006

(65) Prior Publication Data

US 2007/0004895 A1 Jan. 4, 2007

Related U.S. Application Data

(60) Provisional application No. 60/694,847, filed on Jun. 29, 2005, provisional application No. 60/694,855, filed on Jun. 29, 2005.

(51) Int. Cl.
*C08F 283/04* (2006.01)
*C08G 18/28* (2006.01)

(52) U.S. Cl. .............. 525/455; 525/199; 525/200; 525/125; 525/454; 528/48; 528/70; 524/198; 524/200; 524/223; 524/520; 524/544

(58) Field of Classification Search .......... 528/72, 528/48, 70; 428/375, 393, 395; 525/454, 525/455, 199, 200, 125; 524/198, 200, 223, 524/520, 544

See application file for complete search history.

(56) References Cited

U.S. PATENT DOCUMENTS

| | | | |
|---|---|---|---|
| 2,803,615 A | 8/1957 | Ahlbrecht et al. | |
| 3,574,791 A | 4/1971 | Sherman et al. | |
| 3,787,351 A | 1/1974 | Olson | |
| 4,321,404 A | 3/1982 | Williams et al. | |
| 4,508,916 A | 4/1985 | Newell et al. | |
| 4,540,765 A | 9/1985 | Koemm et al. | |
| 4,778,915 A | 10/1988 | Lina et al. | |
| 4,920,190 A | 4/1990 | Lina et al. | |
| 5,100,954 A | 3/1992 | Itoh et al. | |
| 5,144,056 A | 9/1992 | Lina et al. | |
| 5,276,175 A | 1/1994 | Dams et al. | |
| 5,292,796 A | 3/1994 | Dams et al. | |
| 5,344,956 A | 9/1994 | Allewaert et al. | |
| 5,446,118 A | 8/1995 | Shen et al. | |
| 5,453,540 A | 9/1995 | Dams et al. | |
| 5,688,884 A | 11/1997 | Baker et al. | |
| 5,725,789 A * | 3/1998 | Huber et al. | 252/8.62 |
| 5,910,557 A * | 6/1999 | Audenaert et al. | 528/70 |
| 6,224,782 B1 * | 5/2001 | Allewaert et al. | 252/8.62 |
| 6,383,633 B1 * | 5/2002 | Allewaert et al. | 428/375 |
| 6,803,109 B2 * | 10/2004 | Qiu et al. | 428/423.1 |
| 7,081,545 B2 | 7/2006 | Klun et al. | |
| 2005/0143541 A1 | 6/2005 | Caldwell et al. | |
| 2006/0142518 A1* | 6/2006 | Qiu et al. | 526/319 |
| 2006/0142519 A1 | 6/2006 | Qiu et al. | |
| 2006/0142530 A1 | 6/2006 | Moore et al. | |

FOREIGN PATENT DOCUMENTS

| | | |
|---|---|---|
| EP | 0 526 976 | 2/1993 |
| JP | 5-222149 | 8/1993 |
| WO | WO 98/51725 | 11/1998 |
| WO | WO 98/51727 | 11/1998 |

OTHER PUBLICATIONS

Banks, Ed., *Organofluorine Chemicals and Their Industrial Applications*, Ellis Horwood Ltd., Chichester, England, 1979, pp. 226-234.
*Hawley's Condensed Chemical Dictionary* 1067 (1997).
American Association of Textile Chemists and Colorists (AATCC) Standard Test Method No. 118-1983.

* cited by examiner

*Primary Examiner*—Milton I Cano
*Assistant Examiner*—Michael Leonard
(74) *Attorney, Agent, or Firm*—Robert H. Jordan; Lisa P. Fulton

(57) ABSTRACT

The present invention relates to fluorochemical polyurethane compounds, a method for their preparation, a method of application, and compositions comprising that fluorochemical polyurethane compound. The compound and the composition comprising that compound are suitable to impart durable oil- and water-repellency to substrates.

5 Claims, No Drawings

POLYURETHANES DERIVED FROM OLIGOMERIC FLUOROACRYLATES

CROSS REFERENCE TO RELATED APPLICATIONS

This application claims priority to U.S. Provisional Patent Application Nos. 60/694,847 and 60/694,855, both filed Jun. 29, 2005.

FIELD

This invention relates to polyurethanes derived from oligomeric fluoroacrylates and isocyanates that are useful for imparting water- and oil-repellent properties to substrates. In other aspects, this invention also relates to methods of producing such polyurethanes and methods of applying such polyurethanes to substrates to impart water- and oil-repellent properties thereto.

BACKGROUND

The use of various fluorochemical compositions on fibers and fibrous substrates, such as textiles, paper and leather, to impart oil- and water-repellency is known. See for example, Banks, Ed., *Organofluorine Chemicals and Their Industrial Applications*, Ellis Horwood Ltd., Chichester, England, 1979, pp. 226-234.

Certain fluorinated compounds containing urethane bonds are known. A common synthetic route for forming such compounds containing urethane bonds uses isocyanate compounds as starting materials. The use of blocking agents to react with remaining unreacted isocyanate moieties is also known.

Various fluorinated acrylic resins containing urethane linkages are known to have oil and water repellency properties (see, for example, U.S. Pat. No. 4,321,404 (Williams et al.), U.S. Pat. No. 4,778,915 (Lina et al.), U.S. Pat. No. 4,920,190 (Lina et al.), U.S. Pat. No. 5,144,056 (Anton et al.), and U.S. Pat. No. 5,446,118 (Shen et al.)). These resins can be polymerized and applied as coatings to substrates such as, for example, textiles, carpets, wall coverings, leather, and the like to impart water- and oil repellency.

Typically, these resins comprise long chain pendant perfluorinated groups (for example, 8 carbon atoms or greater) because long chains readily align parallel to adjacent pendant groups attached to acrylic backbone units, and thus maximize water- and oil-repellency. However, it has been reported that long chain perfluorinated group-containing compounds such as, for example, perfluorooctyl containing compounds may tend to bioaccumulate in living organisms (see, for example, U.S. Pat. No. 5,688,884 (Baker et al.)).

SUMMARY

The present invention provides novel polyurethane compositions derived from oligomeric fluoroacrylates and isocyanates. These compositions are useful to impart water- and oil-repellent properties to substrates and have been found to provide excellent durable dynamic water repellency to fibrous substrates. The invention also provides a method of producing such compositions and a method of applying such compositions to substrates.

The invention also provides a method for making such compositions that, in brief summary, comprises (1) preparing a functionalized fluoroacrylate spacer oligomer as described herein and (2) reacting such oligomer with mono- or polyfunctional isocyanate to yield a urethane derivative.

In brief summary, fluorochemical polyurethane compounds of the invention can be prepared by reacting:

(a) a fluorochemical spacer oligomer comprising the oligomerization product of fluorochemical spacer monomers alone or in combination with other polymerizable monomers that may be fluorinated or fluorine-free, in the presence of at least one functionalized chain transfer agent, (b) a di-, tri-, or tetravalent isocyanate or combinations thereof, (c) optionally, at least one isocyanate-reactive or blocking group, and, (d) optionally, at least one multi-functional chain extender.

The compositions provide state-of-the-art dynamic water repellency both on synthetic and cellulosic textile substrates, when applied at normal curing conditions. In addition the treatments are very durable to multiple launderings. The compositions are also well soluble in organic solvents.

The novel polyurethanes of the present invention provide durable water- and oil-repellency properties as well as dynamic water repellency formerly achieved through the use of long chain (C8) fluorochemical monomers. The reaction of the functional spacer oligomer with an isocyanate provides novel polyurethanes with desirable continuation of dynamic water repellent and launderable durable properties. The "spacer" group of the functional spacer monomer favors alignment of the fluorochemical side chain to provide improved repellency performance over that provided by typical short chain fluorochemical monomers.

DETAILED DESCRIPTION OF ILLUSTRATIVE EMBODIMENTS

Compositions

Fluorochemical polyurethane compounds of the invention can be prepared by reacting:

(a) a fluorochemical spacer oligomer comprising the oligomerization product of fluorochemical spacer monomers alone or in combination with other polymerizable monomers that may be fluorinated or fluorine-free, in the presence of at least one functionalized chain transfer agent, (b) a di-, tri-, or tetravalent isocyanate or combinations thereof, (c) optionally, at least one blocking agent or isocyanate-reactive group, and, (d) optionally, at least one multi-functional chain extender.

A first subject-matter of the present invention is thus a fluorochemical polyurethane compound represented by formula (I):

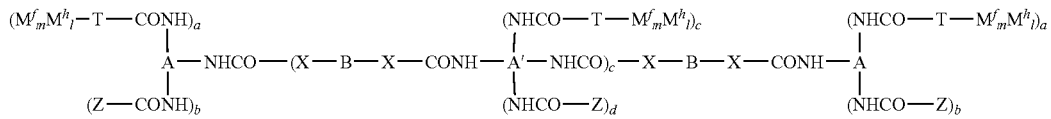

wherein:

$M^f_m M^h_l$ is a fluorochemical spacer oligomer, comprising m units derived from a fluorochemical spacer monomer, $M^f$, and l units derived from one or more other polymerizable monomers, $M^h$, that may be fluorinated or fluorine-free, wherein the fluorochemical spacer monomers and polymerizable monomers may be the same or different;

m is a number from 2 to 40, inclusive;

l is a number from 0 to 20, inclusive;

T is an organic linking group obtained by removing a hydrogen atom from a chain transfer agent, and the T residues may be the same or may be different;

Z is a residue obtained by removing a hydrogen atom from an isocyanate-reactive group or blocking group, and the Z residues may be the same or may be different;

A and A' are independently a di- tri- or tetravalent residue obtained by removing 2, 3, or 4 —NCO groups from a corresponding isocyanate, and the A residues and A' residues may be the same or may be different;

B is a divalent organic residue obtained by removing the two X—H groups from a difunctional active hydrogen compound HX—B—XH, wherein X is independently O, NH, or S, and the B residues may be the same or may be different;

a is a number from 1 to 3, inclusive and b is a number from 0 to 2, inclusive, with the proviso that a+b has a value from 1 to 3;

c is a number from 0 to 30 inclusive;

d and e are numbers from 0 to 2, inclusive, provided that d+e is not greater than 2.

The compounds of the present invention represented by the formula (I) are polyurethanes, i.e., they comprise at least one polymeric portion within their molecule which is obtained by the reaction of isocyanate group containing compounds with a chain extender having two isocyanate reactive X—H groups. The moiety derived from the chain extender is represented in the formula (I) by the residue —X—B—X—. These fluorochemical polyurethane compounds exhibit the surprising ability to impart not only high initial oil- and water-repellency to treated substrates but also durable repellency which does not disappear after repeated launderings.

A second subject-matter of the present invention is thus a fluorochemical polyurethane compound represented by formula (II):

(II)

wherein:

$M^f_m M^h_l$ is a fluorochemical spacer oligomer, comprising m units derived from a fluorochemical spacer monomer, $M^f$, and l units derived from one or more other polymerizable monomers, $M^h$, that may be fluorinated or fluorine-free, wherein the fluorochemical spacer monomers and polymerizable monomers may be the same or different;

m is a number from 2 to 40, inclusive;

l is a number from 0 to 20, inclusive;

T is an organic linking group obtained by removing a hydrogen atom from a chain transfer agent, and the T residues may be the same or may be different;

Z is a residue obtained by removing a hydrogen atom from an isocyanate-reactive group or blocking group, and the Z residues may be the same or may be different;

A is a di- tri- or tetravalent residue obtained by removing 2, 3, or 4 —NCO groups from a corresponding isocyanate;

a is a number from 1 to 4, inclusive, and b is a number from 0 to 3, inclusive, with the proviso that a+b has a value from 2 to 4.

Another subject-matter of the present invention is a method of preparing a fluorochemical polyurethane compounds of formulas (I) and (II) which comprises reacting a fluorochemical oligomer of the formula (III)

$$M^f_m M^h_l\text{-TH} \qquad (III)$$

wherein $M^f_m M^h_l$ and T are defined as above, with at least one isocyanate of formula (IV)

$$A(NCO)_x \qquad (IV)$$

wherein A is defined as above and x is a number from 2 to 4, inclusive, and in the case of compounds of formula (I), optionally at least one bifunctional active hydrogen compound of formula (V)

$$HX\text{—}B\text{—}XH \qquad (V)$$

wherein X and B are defined as above, and optionally at least one compound of formula (VI)

$$Z\text{—}H \qquad (VI)$$

wherein Z is defined as above.

The fluorochemical polyurethane compound may be used in the form of a solution or dispersion and is generally employed as a composition comprising the compound which composition constitutes a further subject-matter of the invention. The treatment provides strong initial repellency to substrates including textile fibers, such as cotton, polyester, polyamide or blends thereof, protective clothing made from aramid type fibers or polyvinyl chloride, fabrics such as apparel, PTFE-backed or polyurethane-backed laminates, upholstery and carpet, non-wovens, leather, paper, wood, metal, glass, concrete and stone, and displays a high durability to dry cleaning and home laundering.

Still another subject matter of the present invention is the use of a fluorochemical polyurethane compound or of a composition comprising said compound to impart durable oil- and water-repellency to a substrate treated therewith. Said treatment comprises the steps of (1) applying to the surface of a substrate an amount of the fluorochemical polyurethane compound of the invention or of a composition comprising said compound, effective to impart oil- and water-repellent properties to the substrate, wherein said compound is present in an amount of about 0.01 percent to about 5 percent by weight based on the weight of the substrate, and (2) heating the treated substrate from step 1 at a temperature and for a time sufficient to cure the treated substrate.

Fluorochemical Polyurethane Compounds

The fluorochemical polyurethane compounds of the present invention can be prepared in a two step reaction. In a first step, a functionalized fluorochemical spacer oligomer is prepared, which in a second step is further reacted to form a polyurethane.

In a first step, a fluorochemical oligomer is conveniently prepared by free-radical oligomerization of fluorochemical spacer monomers alone or in combination with other polymerizable monomers, in the presence of hydroxy-, amino-, or mercapto functionalized chain transfer agents. The fluorochemical spacer oligomer preferably comprises from 2 to about 40 polymerized units derived from fluorochemical spacer monomers and from 0 to about 20 polymerized units derived from other monomers.

Fluorochemical Spacer Monomer

Fluorochemical spacer monomers used in some embodiments of the invention are as described in U.S. Patent Application Publication No. 2005/0143541, which is incorporated herein by reference in its entirety, and can comprise the reaction product of a) fluorochemical alcohol, b) one unbranched symmetric diisocyanate, and c) hydroxyl terminated alkyl (meth)acrylates.

Fluorochemical spacer monomers used in some embodiments of the invention can be represented by the following general formula:

$C_nF_{2n+1}$—X'—OC(O)NH-A"-HNC(O)O—$(C_pH_{2p})$
(O)COC(R')=CH$_2$ wherein n is 1 to 20, preferably 1 to 6, most preferably 4 to 6; X' is

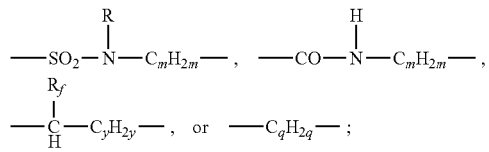

R is H or an alkyl group of 1 to 4 carbon atoms; m is 2 to 8; $R_f$ is $C_nF_{2n+1}$; y is 0 to 6; q is 1 to 20; A" is an unbranched symmetric alkylene group, arylene group, or aralkylene group; p is 2 to 30, and R' is H, CH$_3$, or F.

Preferably, n is 1 to 6; more preferably, n is 4 to 6. Preferably, q is 2. Preferably, X' is

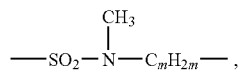

and m is 2 to 4.

Preferably, A" is selected from the group consisting of —C$_6$H$_{12}$—,

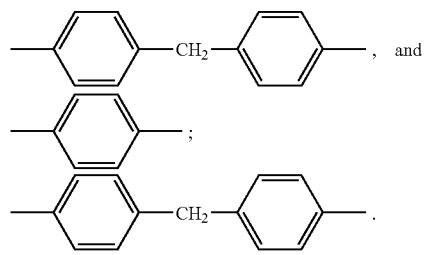

more preferably, A" is

Preferably, p is 2 to 12; more preferably, p is selected from the group consisting of 2, 4, 6, 10, and 12; most preferably, p is 2.

Preferably, R' is H.

a) Fluorochemical Alcohols

Fluorochemical alcohols that are useful in the fluorochemical spacer monomer of the invention can be represented by the formula:

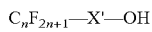
$C_nF_{2n+1}$—X'—OH wherein n is 1 to 20, preferably 1 to 6, most preferably 4 to 6; X' is

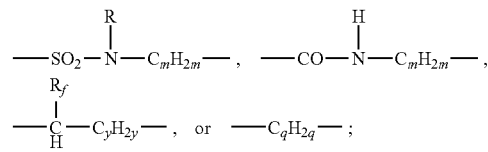

R is hydrogen or an alkyl group of 1 to 4 carbon atoms; m is 2 to 8; $R_f$ is $C_nF_{2n+1}$; y is 0 to 6; and q is 1 to 8.

Representative examples of suitable alcohols include CF$_3$CH$_2$OH, (CF$_3$)$_2$CHOH, (CF$_3$)$_2$CFCH$_2$OH, C$_2$F$_5$SO$_2$NH(CH$_2$)$_2$OH, C$_2$F$_5$SO$_2$NCH$_3$(CH$_2$)$_2$OH, C$_2$F$_5$SO2NCH3(CH2)4OH, C$_2$F$_5$SO$_2$NC$_2$H$_5$(CH$_2$)$_6$OH, C$_2$F$_5$(CH$_2$)$_4$OH, C$_2$F$_5$CONH(CH$_2$)$_4$OH, C$_3$F$_7$SO$_2$NCH$_3$(CH$_2$)$_3$OH, C$_3$F$_7$SO$_2$NH(CH$_2$)$_2$OH, C$_3$F$_7$CH$_2$OH, C$_3$F$_7$CONH(CH$_2$)$_8$OH, C$_4$F$_9$(CH$_2$)$_2$OH, C$_4$F$_9$SO$_2$NCH$_3$(CH$_2$)$_2$OH, C$_4$F$_9$CONH(CH$_2$)$_2$OH, C$_4$F$_9$SO$_2$NCH$_3$(CH$_2$)$_4$OH, C$_4$F$_9$SO$_2$NH(CH$_2$)$_7$OH, C$_4$F$_9$SO$_2$NC$_3$H$_7$(CH$_2$)$_2$OH, C$_4$F$_9$SO$_2$NC$_4$H$_9$(CH$_2$)$_2$OH, C$_5$F$_{11}$SO$_2$NCH$_3$(CH$_2$)$_2$OH, C$_5$F$_{11}$CONH(CH$_2$)$_2$OH, C$_5$F$_{11}$(CH$_2$)$_4$OH, C$_6$F$_{13}$CH$_2$CH$_2$OH, C$_4$F$_9$C$_2$H$_4$OH, and C$_4$F$_9$C$_2$H$_4$SC$_2$H$_4$OH.

Preferably, n is 1 to 6; more preferably, n is 4 to 6. Preferably, m is 2 to 4. Preferably, q is 2.

Preferably, X' is

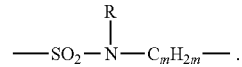

More preferably, X' is

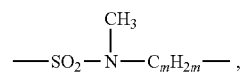

Most preferably, X' is selected from the group consisting of

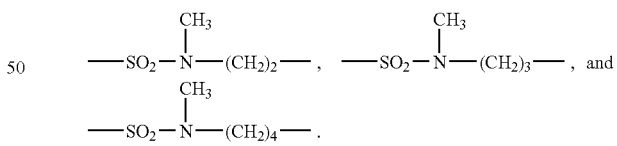

Most preferred fluorochemical alcohols include, for example, C$_4$F$_9$SO$_2$NCH$_3$(CH$_2$)$_2$OH, C$_4$F$_9$SO$_2$NCH$_3$(CH$_2$)$_4$OH, C$_4$F$_9$(CH$_2$)$_2$OH, and C$_6$F$_{13}$C$_2$H$_4$OH.

b) Symmetric Diisocyanates

Symmetric diisocyanates are diisocyanates that meet the three elements of symmetry as defined by *Hawley's Condensed Chemical Dictionary* 1067 (1997). First, they have a center of symmetry, around which the constituent atoms are located in an ordered arrangement. There is only one such center in the molecule, which may or may not be an atom. Second, they have a plane of symmetry, which divides the molecule into mirror-image segments. Third, they have axes of symmetry, which can be represented by lines passing through the center of symmetry. If the molecule is rotated, it will have the same position in space more than once in a complete 360° turn.

As used herein, the term "unbranched" means that the symmetric diisocyanate does not contain any subordinate chains of one or more carbon atoms.

Representative examples of unbranched symmetric diisocyanates include 4,4'-diphenylmethane diisocyanate (MDI), 1,6-hexamethylene diisocyanate (HDI), 1,4-phenylene diisocyanate (PDI), 1,4-butane diisocyanate (BDI), 1,8-octane diisocyanate (ODI), 1,12-dodecane diisocyanate, and 1,4-xylylene diisocyanate (XDI).

Preferred unbranched symmetric diisocyanates include, for example, MDI, HDI, and PDI. A more preferred unbranched symmetric diisocyanate is MDI. In its pure form, MDI is commercially available as ISONATE™ 125M from Dow Chemical Company (Midland, Mich.), and as MONDUR™ from Bayer Polymers (Pittsburgh, Pa.).

c) Hydroxy-terminated Alkyl(meth)acrylates

Hydroxy-terminated alkyl (meth)acrylate and 2-fluoroacrylate monomers that are useful in the fluorochemical spacer monomers of the invention can have from 2 to about 30 carbon atoms (preferably, from 2 to about 12 carbon atoms) in their alkylene portion.

Preferably, the hydroxy-terminated alkyl (meth)acrylate monomer is a hydroxy-terminated alkyl acrylate. Preferred hydroxy-terminated alkyl acrylates include, for example, hydroxy ethyl acrylate, hydroxy butyl acrylate, hydroxy hexyl acrylate, hydroxy decyl acrylate, hydroxy dodecyl acrylate, and mixtures thereof.

The fluorochemical spacer monomers of the invention can be prepared, for example, by first combining the fluorochemical alcohol and the unbranched symmetric diisocyanate in a solvent, and then adding the hydroxy-terminated alkyl (meth) acrylate. Useful solvents include esters (for example, ethyl acetate), ketones (for example, methyl ethyl ketone), ethers (for example, methyl-tert-butyl ether), and aromatic solvents (for example, toluene).

Preferably, the reaction mixture is agitated. The reaction can generally be carried out at a temperature between room temperature and about 120° C. (preferably, between about 50° C. and about 70° C.).

Typically the reaction is carried out in the presence of a catalyst. Useful catalysts include bases (for example, tertiary amines, alkoxides, and carboxylates), metal salts and chelates, organometallic compounds, acids and urethanes. Preferably, the catalyst is an organotin compound (for example, dibutyltin dilaurate (DBTDL) or a tertiary amine (for example, diazobicyclo[2.2.2]octane (DABCO)), or a combination thereof. More preferably, the catalyst is DBTDL.

When fluorochemical alcohols represented by the formula $C_nF_{2n+1}SO_2NCH_3(CH_2)_mOH$, wherein n is 2 to 5, and m is 2 to 4, are reacted with MDI, the process described in U.S. patent application Ser. No. 10/751,142, entitled "Process For Preparing Fluorochemical Monoisocyanates," filed on Dec. 31, 2003, can be used.

Other Polymerizable Moieties

Other polymerizable moieties, $M^h$, for use in the functional spacer oligomer might include fluorochemical monomers which can be represented by the following formula (VII):

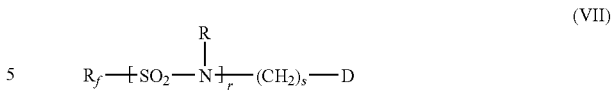

wherein $R_f$ is $C_nF_{2n+1}$ with n being 3 to 18, preferably 6 to 12; r is 0 or 1; s is 1 to 8, preferably 1 or 2; D is a group comprising a radically polymerizable unsaturated residue; and R is methyl or ethyl.

Fluorochemical monomers as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976.

Preferred examples of fluorochemical monomers include:

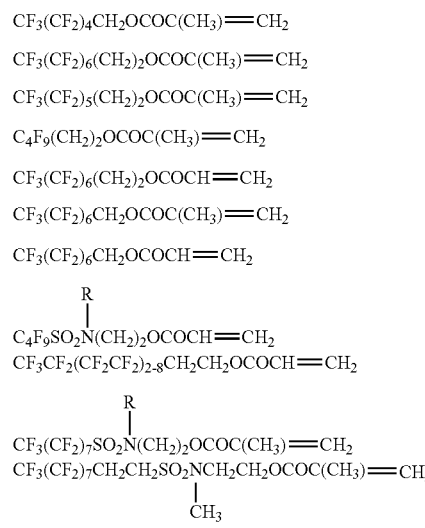

R is methyl or ethyl.

Hydrocarbon monomers suitable for use as $M^h$ in the preparation of the fluorochemical spacer oligomers are also well known and generally commercially available. Examples of such compounds include general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethyl-hexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride, vinyl caprolactam, and 1-vinyl-2-pyrrolidinone. Preferred co-monomers which can be copolymerized with the above-described fluoroaliphatic radical-containing monomers include those selected from octadecylmethacrylate, 1,4-butanediol diacrylate, polyreuthane diacrylates, polyethylene glycol diacrylates, polypropylene glycol diacrylates, laurylmethacrylate, butylacrylate, N-methylol acrylamide, isobutylmethacrylate, ethylhexyl acrylate, ethylhexyl methacylate, vinylchloride and vinylidene chloride.

Functionalized Chain Transfer Agents

The hydroxy-, amino and/or mercapto functionalized chain transfer agents T-H useful in the preparation of the fluorochemical spacer oligomer include those selected from 2-mercaptoethanol, 3-mercapto-2-butanol, 3-mercapto-2-propanol, 3-mercapto-1-propanol, 3-mercapto-1,2-propanediol, 2,3-dimercaptopropanol, 2-mercapto-ethylamine and 2-mercaptoethylsulfide. A single compound or a mixture of different chain transfer agents may be used. The chain transfer agents which are preferably used in the preparation of the fluorochemical oligomer contain only two functional groups so that after reaction with the oligomer only one isocyanate reactive group remains on the obtained fluorochemical oligomer. The preferred chain transfer agent is 2-mercaptoethanol.

In another embodiment, the $M^h$ can be an isocyanate-reactive monomer, such as 2-hydroxyethylacrylate, in which case the chain transfer agent is optionally functional.

In order to prepare the functionalized fluorochemical oligomer, a free-radical initiator is present. Such free-radical initiators are known in the art and include azo compounds, such as azobisisobutyronitrile (AIBN) and azo-2-cyanovaleric acid and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

Fluorochemical Urethane

In a second step of the reaction, the fluorochemical spacer oligomer is reacted with an isocyanate, and optionally a chain extender and optionally a blocking agent or other isocyanate-reactive agent. Suitable isocyanates $A(NCO)_x$, with x being 2, 3, or 4, for use in preparing the fluorochemical polyurethanes of formula I include aromatic diisocyanates such as 4,4'-methylene-diphenylene diisocyanate (MDI) and 2,4-toluene diisocyanate (2,4-TDI); alicyclic diisocyanates such as 3-isocyanatomethyl-3,5,5-trimethyl-cyclohexyl isocyanate (IPDI), 1,4-cyclohexane diisocyanate and 4,4'-cyclohexylmethane diisocyanate; aliphatic diisocyanates such as methylene diisocyanate, 1,6-hexamethylene diisocyanate, 2,2,4-trimethyl-1,6-hexamethylene diisocyanate, and 1,2-ethylene diisocyanate; aliphatic triisocyanates such as 1,3,6-hexamethylenetriisocyanate; aromatic triisocyanates, such as 4,4', 4"-triphenylmethane triisocyanate; polyisocyanates such as polymethylene-polyphenyl-isocyanate (PAPI); isocyanurates, such as the trimer of hexamethylenediisocyanate and the trimer of IPDI and mixtures thereof.

In the preparation of the fluorochemical polyurethane compounds of the invention it is preferred that not only difunctional isocyanates, i.e., isocyanates $A(NCO)_2$, are used, but that at least some higher functional, e.g., trifunctional isocyanate is employed.

This means that the fluorochemical polyurethane compounds of the invention are preferably not just linear compounds obtained from diisocyanates but contain at least some sites of branching due to the inclusion of tri- or tetraisocyanates. More preferably, at least about 50 percent, most preferably more than about 90 percent of the isocyanates employed are triisocyanates.

Blocking Group or Isocyanate-Reactive Group

Conventional blocking groups and/or isocyanate-reactive agents include alcohols such as methanol, ethanol, n-propyl alcohol, isopropyl alcohol, n-butyl alcohol, isobutyl alcohol, t-butyl alcohol, n-amyl alcohol, t-amyl alcohol, 2-ethylhexanol, glycidol, (iso)stearylalcohol; aryl alcohols (e.g., phenols, cresols, nitrophenols, o- and p-chlorophenol, napthols, 4-hydroxybiphenyl); fluorochemical alcohols such as

and HFPO oligomer alcohol; $C_2$ to $C_8$ alkanone oximes (e.g., acetone oxime, butanone oxime); benzophenone oxime; arylthiols (e.g., thiophenol); organic carbanion active hydrogen compounds (e.g., diethyl malonate, acetylacetone, ethyl acetoacetate, ethylcyanoacetate); epsilon-caprolactam; primary or secondary amines (e.g., butyl amine); hydroxylamine; primary amino mercaptans and secondary amino mercaptans. A single compound or a mixture of different masking or blocking agents may be used. Particularly preferred blocking agents include $C_2$ to $C_8$ alkanone oximes, e.g., 2-butanone oxime, monofunctional alcohols such as 2-ethylhexanol and (iso)stearylalcohol.

Extender

Difunctional chain extenders HX—B—XH suitable in the formation of the fluorochemical polyurethane compounds of the invention include difunctional alcohols, thiols and amines. A single compound or a mixture of different chain extenders may be used. Examples include diols such as 1,4-butanediol, 1,6-hexanediol, 1-10-decanediol, 4,4'-isopropylidene diphenol (Bisphenol A); polyester diols, such as polycaprolactone diol, fatty acid dimer diols and poly(oxy)alkylenediols with an oxyalkylene group having 2 to 4 carbon atoms, such as —OCH$_2$CH$_2$—, —O(CH$_2$)$_4$—, —OCH$_2$CH$_2$CH$_2$—, —OCH(CH$_3$)CH$_2$— and —OCH(CH$_3$)CH(CH$_3$)— (preferably the oxyalkylene units in said poly(oxyalkylene) being the same, as in polypropyleneglycol or present as a mixture). In a preferred embodiment the group B comprises siloxane groups, such as dimethylsiloxane groups, which impart soft hand to the substrate treated with the fluorochemical polyurethane. Furthermore, the group B may be partially fluorinated in order to enhance the oil- and water-repellent characteristics of the compound.

Further examples of multifunctional chain extenders that can be used include polyols that comprise at least one fluorine-containing group selected from the group consisting of perfluoroalkyl, perfluoroheteroalkyl, and perfluoroalkylene moieties. All of the perfluorocarbon chains, comprising these perfluoro moieties, are preferably six or fewer carbon atoms. Perfluoroalkyl moieties are preferred, with perfluoroalkyl moieties having 6 or fewer carbon atoms being preferred and 3 to 5 carbon atoms being most preferred. Perfluoroheteroalkyl moieties may have 3 to 50 carbon atoms. Perfluoroheteroalkylene groups may have from about 3 to about 50 carbon atoms. Perfluoroheteroalkyl and alkylene moieties are preferably perfluoropolyethers with no perfluorocarbon chain of more than six carbon atoms.

Representative examples of suitable fluorinated polyols comprised of at least one fluorine-containing group include $R_fSO_2N(CH_2CH_2OH)_2$ such as N-bis(2-hydroxyethyl)perfluorobutylsulfonamide; $R_fOC_6H_4SO_2N(CH_2CH_2OH)_2$; $R_fSO_2N(R')CH_2CH(OH)CH_2OH$ such as $C_6F_{13}SO_2N(C_3H_7)CH_2CH(OH)CH_2OH$; $R_fCH_2CON(CH_2CH_2OH)_2$; $R_fCON(CH_2CH_2OH)_2$; $CF_3CF_2(OCF_2CF_2)_3OCF_2CON(CH3)CH2CH(OH)CH2OH$; $R_fOCH_2CH(OH)CH_2OH$ such as $C_4F_9OCH_2CH(OH)CH_2OH$; $R_fCH_2CH_2SC_3H_6OCH_2CH(OH)CH_2OH$; $R_fCH_2CH_2SC_3H_6CH(CH_2OH)_2$; $R_fCH_2CH_2SCH_2CH(OH)CH_2OH$; $R_fCH_2CH_2SCH(CH_2OH)CH_2CH_2OH$; $R_fCH_2CH_2CH_2SCH_2CH(OH)CH_2OH$ such as $C_5F_{11}(CH_2)_3SCH_2CH(OH)CH_2OH$; $R_fCH_2CH_2CH_2OCH_2CH(OH)CH_2OH$ such as $C_5F_{11}(CH_2)_3OCH_2CH(OH)CH_2OH$; $R_fCH_2CH_2CH_2OC_2H_4OCH_2CH(OH)CH_2OH$; $R_fCH_2CH_2(CH_3)OCH_2CH(OH)CH_2OH$; $R_f(CH_2)_4SC_3H_6CH(CH_2OH)CH_2OH$; $R_f(CH_2)_4SCH_2CH(CH_2OH)_2$; $R_f(CH_2)_4SC_3H_6OCH_2CH(OH)CH_2OH$; $R_fCH_2CH(C_4H_9)SCH_2CH(OH)CH_2OH$; $R_fCH_2OCH_2CH(OH)CH_2OH$; $R_fCH2CH(OH)CH_2SCH_2CH_2OH$; $R_fCH_2CH(OH)CH_2SCH_2CH_2OH$; $R_fCH_2CH(OH)CH_2OCH_2CH_2OH$; $R_fCH_2CH(OH)CH_2OH$; $R_fR"SCH(R"'OH)CH(R"'OH)SR"R_f$; $(R_fCH_2CH_2SCH_2CH_2SCH_2)_2C(CH_2OH)_2$; $((CF_3)_2CFO(CF_2)_2(CH_2)_2SCH_2)_2C(CH_2OH)_2$; $(R_fR"SCH_2)_2C(CH_2OH)_2$; 1,4-bis(1-hydroxy-1,1-dihydroperfluoroethoxyethoxy)perfluoro-n-butane $(HOCH_2CF_2OC_2F_4O(CF_2)_4OC_2F_4OCF_2CH_2OH)$; 1,4-bis(1-hydroxy-1,1-dihydroperfluoropropoxy)perfluoro-n-butane $(HOCH_2CF_2CF_2O(CF_2)_4OCF_2CF_2CH_2OH)$; fluorinated oxetane polyols made by the ring-opening polymerization of fluorinated oxetane such as Poly-3-Fox™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al.); and perfluoropolyether diols such as FOMBLIN™ ZDOL $(HOCH_2CF_2O(CF_2O)_{8-12}(CF_2CF_2O)_{8-12}CF_2CH_2OH$, available from Ausimont); wherein $R_f$ is a perfluoroalkyl group having 1 to 6 carbon atoms, or a perfluoroheteroalkyl group having 3 to about 50 carbon atoms with all perfluorocarbon chains present having 6 or fewer carbon atoms, or mixtures thereof; R' is alkyl of 1 to 4 carbon atoms; R" is branched or straight cahin alkylene of 1 to 12 carbon atoms, alkylenethioalkylene of 2 to 12 carbon atoms, alkylene-oxyalkylene of 2 to 12 carbon atoms, or alkylene iminoalkylene of 2 to 12 carbon atoms, where the nitrogen atom contains as a third substituent hydrogen or alkyl of 1 to 6 carbon atoms; and R'" is a straight or branched chain alkylene of 1 to 12 carbon atoms or an alkylene-polyoxyalkylene of formula $C_rH_{2r}(OC_sH_2S)_n$ where r is 1-12, s is 2-6, and t is 1-40.

Step 2 is carried out under conventional urethane forming conditions. The reaction is carried out under dry conditions preferably in a polar solvent such as ethyl acetate, acetone, methyl ethyl ketone and methyl isobutyl ketone. Preferably the reaction is run in the presence of a catalyst. Preferred catalysts include tin salts such as dibutyltin dilaurate and stannous octoate. Suitable reaction temperatures will be readily determined by those skilled in the art based on the particular reagents, solvent, and catalysts being used.

The fluorochemical polyurethane compound of this invention can be applied using conventional application methods and can be used as an aqueous dispersion or alternatively it can be used as a treatment composition in a solvent. A dispersion will generally contain water, an amount of compound effective to provide repellent properties to a substrate treated therewith, and a surfactant in an amount effective to stabilize the dispersion. Water is preferably present in an amount of about 70 to about 20,000 parts by weight based on 100 parts by weight of the compound of the invention. The surfactant is preferably present in an amount of about 1 to about 25 parts by weight, preferably about 3 to about 10 parts by weight, based on 100 parts by weight of the composition of the invention. Conventional cationic, nonionic, anionic, and zwitterionic surfactants are suitable.

Method of Applying

The amount of the treating composition applied to a substrate in accordance with this invention is chosen so that sufficiently high or desirable water and oil repellencies are imparted to the substrate surface, said amount usually being such that about 0.01 percent to about 5 percent by weight, preferably about 0.05 percent to about 2 percent by weight, based on the weight of the substrate, of fluorochemical treating agent is present on the treated substrate. The amount which is sufficient to impart desired repellency can be determined empirically and can be increased as necessary or desired. In order to treat a substrate, the substrate can be immersed in the dispersion and agitated until it is saturated. The saturated substrate can then be run through a padder/roller to remove excess dispersion, dried in an oven at a relatively low temperature (e.g., 70° C.) for a time sufficient to remove the dispersion medium (e.g., water, ethylene glycol, or a mixture thereof), and cured at a temperature and for a time sufficient to provide a cured treated substrate. This curing process can be carried out at temperatures between about 70° C. and about 190° C. depending on the particular system or application method used. In general, a temperature of about 170° C. for a period of about 20 seconds to 3 minutes, preferably 1 to 2 minutes, is suitable. The cured treated substrate can be used as desired, e.g., incorporated or fashioned into a garment.

Substrates

In order to improve fixing of the composition of the invention to a substrate, it is sometimes advantageous to include in the dispersion certain additives, polymers, thermo-condensable products and catalysts capable of promoting interaction with the substrate. Among these are the condensates or precondensates of urea or melamine with formaldehyde and glyoxal resins. Particular suitable additives and amounts thereof can be selected by those skilled in the art.

The substrates treated by the water and oil repellency imparting composition of this invention are not especially limited and include, e.g., textile fibers, such as cotton, polyester, polyamide or blends thereof; protective clothing made from aramid type fibers or polyvinyl chloride; fabrics such as apparel, upholstery and carpet; non-wovens, leather, paper, wood, metal, glass, concrete and stone, plastic. Preferred are fibers, woven or non-woven fabrics, carpets, leather and paper.

Objects and advantages of this invention are further illustrated by the following examples, but the particular materials and amounts thereof recited in these examples, as well as other conditions and details, should not be construed to unduly limit this invention.

EXAMPLES

The invention is further explained with the following illustrative examples.

Glossary:
ABS: Absorption
BuMA: Butyl methacrylate from Aldrich
C₄MH: MeFBSE-MDI-HEA adduct
Desmodur N3300: HMDI trimer (triisocyanurate)
2EH: 2-ethyl hexanol
ETHOQUAD™ C-12: dodecyl trimethyl ammonium chloride (75% in $H_2O$) from Akzo-Nobel
FC: fluorochemical
HC: hydrocarbon
HFPO Oligomer alcohol from 3M
2ME: 2-mercapto ethanol
Lauryl MA: Lauryl methacrylate from Aldrich
LPO: lauryl peroxide
MeFBSE(M)A: N-methyl perfluoro-butyl sulfonamidoethyl (meth)acrylate
MEKO: methyl ethyl ketoxime, 2-butanone oxime
MIBK: methyl isobutyl ketone, 4-methyl-2-pentanone
MPD: 3-mercapto 1,2 propane diol, 9-Octadecene-1,18-diol from COGNIS
OD(M)A: octadecyl or stearyl (meth)acrylate
OR: OIL REPELLENCY test
PA: polyamide
PAPI: VORANATE M220: polyaromatic polyisocyanate
PAPI 27: PAPI 27 Polymeric MDI similar to VORANATE M220, but different MWD
PAµ: polyamide microfiber
PES: polyester
PESµ: polyester microfiber
PES/Co: polyester/cotton
SOF: solids on fiber
SPOL: spacer oligomer
SPOLdiol: spacer oligomer diol
SR: SPRAY RATING test
TERGITOL™ 15S30: $C_{12-16}$ alkyl polyoxyethylene (30 EO) surfactant from Rohm & Haas
TERGITOL™ TMN-6: trimethyl nonane polyoxyethylene (6 EO) surfactant from Rohm & Haas
V-59: azo-initiator from Wako
VORANATE™ M220: polyaromatic polyisocyanate from Dow Chemical Co. (PAPI)
$VCl_2$: vinylidene chloride
WR: IPA/water static repellency test Test Methods
Spray Rating (SR)

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and was expressed in terms of a 'spray rating' of the tested substrate. The spray rating was obtained by spraying 250 ml water on the substrate from a height of 15 cm. The wetting pattern was visually rated using a 0 to 100 scale, where 0 means complete wetting and 100 means no wetting at all.

Oil Repellency (OR)

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to NUJOL® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

| Standard Test Liquids | |
|---|---|
| AATCC Oil Repellency Rating Number | Compositions |
| 1 | NUJOL ® |
| 2 | NUJOL ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Bundesmann Test

The impregnating effect of rain on treated substrates was determined using the Bundesmann Test Method (DIN 53888). In this test, the treated substrates were subjected to a simulated rainfall, while the back of the substrate was being rubbed. The appearance of the upper exposed surface was checked visually after 1, 5 and 10 minutes and was given a rating between 1 (complete surface wetting) and 5 (no water remains on the surface). Besides the observation of the wetting pattern, also the water absorption (% abs) was measured. Well-treated samples gave low absorption results.

Water Repellency Test (WR)

The water repellency (WR) of a substrate was measured using a series of water-isopropyl alcohol test liquids and was expressed in terms of the "WR" rating of the treated substrate. The WR rating corresponded to the most penetrating test liquid which did not penetrate or wet the substrate surface after 15 seconds exposure. Substrates which were penetrated by or were resistant only to 100% water (0% isopropyl alcohol), the least penetrating test liquid, were given a rating of 0, whereas substrates resistant to 100% isopropyl alcohol (0% water), the most penetrating test liquid, were given a rating of 10. Other intermediate ratings were calculated by dividing the percent isopropylalcohol in the test liquid by 10, e.g., a treated substrate resistant to a 70%/30% isopropyl alcohol/water blend, but not to an 80%/20% blend, would be given a rating of 7.

Laundering Procedure

The procedure set forth below was used to prepare treated substrate samples designated in the examples below as 5HL IR (5 Home Launderings—ironing).

A 230 g sample of generally square, 400 $cm^2$ to about 900 $cm^2$ sheets of treated substrate was placed in a washing machine along with a ballast sample (1.9 kg of 8 oz fabric in the form of generally square, hemmed 8100 $cm^2$ sheets). A commercial detergent (SAPTON Brand Detergent, available from Henkel, Germany, 46 g) was added and the washer was filled to high water level with hot water (40° C.+/−3° C.). The substrate and ballast load were washed five times using a 12-minute normal wash cycle followed by five rinse cycles and centrifuging. The samples were not dried between repeat cycles. After drying, the samples were pressed using an iron with the temperature set for the fiber of the substrate.

Dynamic Contact Angle Measurement

A test solution, emulsion, or suspension (typically at about 3% solids) was applied to nylon 66 film (available from DuPont) by dip-coating strips of the film. Prior to coating the film was cleaned with methyl alcohol. Using a small binder clip to hold one end of the nylon film, the strip was immersed in the treating solution, and then withdrawn slowly and smoothly from the solution. The coated strip was allowed to air dry in a protected location for a minimum of 30 minutes and then was cured for 10 minutes at 150 C.

Advancing and receding contact angles on the coated film were measured using a CAHN Dynamic Contact Angle Analyzer, Model DCA 322 (a Wilhelmy balance apparatus equipped with a computer for control and data processing, commercially available from ATI, Madison, Wis.). Water and hexadecane were used as probe liquids. Values for both water and hexadecane are reported.

Spacer oligomer 1, i.e., SPOL 1, was prepared with a 4:2:1 molar ratio of $C_4MH$, ODA, and $HSCH_2CH_2OH$. Spacer oligomer diol, i.e., SPOL diol, was prepared with a 4:2:1 molar ratio of $C_4MH$, ODA, and $HS—CH_2CHOHCH_2OH$.

| Aromatic SPOL urethane derivatives | |
|---|---|
| Sample No. | formulation (mole ratio) |
| 1 | SPOL1/PAPI/MEKO (1:1.2:2.6) |
| 2 | SPOL1/PAPI/MEKO (2:1:1) |
| 3 | SPOL1/PAPI/MEKO/2EH (1:1:1:1) |
| 4 | SPOL1/PAPI/2EH (1:1:2) |
| 8 | SPOL1/PAPI/MEKO (1:1.33:3) |
| 9 | SPOL1/PAPI/MEKO (1:1.66:4) |

| Aliphatic SPOL urethane derivatives | |
|---|---|
| Sample No. | formulation (mole ratio) |
| 6 | SPOL1/Desmodur N3300/MEKO (1:1:2) |
| 7 | SPOL1/Desmodur N3300/2EH (1:1:2) |

| Aromatic SPOLdiol urethane derivatives | |
|---|---|
| Sample No. | formulation (mole ratio) |
| 10 | SPOL diol 1/PAPI/MEKO (1:2:5) |
| 11 | SPOL diol 1/PAPI/2EH (1:2:5) |

All above products are first prepared at 40% in an organic solvent (e.g., MIBK, MEK) and subsequently post-emulsified in water using a combined cationic/nonionic emulsifier system (see experimental section).

Application

Aqueous dispersions of the products of the invention and reference products are applied on PES, PA, PES-CO, and CO test fabrics via pad-application at 0.3% SOF, followed by 1.5 cure at 160° C.

Performance Results

Initial performance results are obtained after 24 hours conditioning. Performance durability is measured after 5 launderings of the initially treated fabrics at 40° C., using standard detergent, followed by ironing at 120° C. Performance results are illustrated in the following tables and graphs.

On PES (0030.1), 0.3 percent SOF, cured 1.5 minutes at 160° C., the following results were obtained.

| | Initial | | | Bundesman | | | Ironing | | |
|---|---|---|---|---|---|---|---|---|---|
| Example | INOR | INWR | INSR | 1' | 5' | 10' | ABS | OR | SR |
| CE1 | 4 | 4 | 100 | 4 | 2 | 1 | 16 | 0 | 0 |
| CE2 | 4 | 4 | 100 | 4 | 2 | 1 | 16 | 0 | 0 |
| 1 | 2 | 3 | 100 | 5 | 5 | 5 | 5 | 0 | 90 |
| 2 | 3 | 3 | 100 | 5 | 5 | 4 | 6 | 0 | 70 |
| 3 | 2 | 3 | 100 | 5 | 5 | 4 | 5 | 0 | 70 |
| 4 | 3 | 4 | 100 | 4 | 4 | 3 | 10 | 0 | 50 |
| 6 | 3 | 3 | 100 | 5 | 4 | 4 | 11 | | 50 |
| 7 | 3 | 4 | 100 | 3 | 2 | 1 | 24 | | 0 |
| 8 | 3 | 3 | 100 | 5 | 5 | 5 | 2 | 0 | 90 |
| 9 | 3 | 2 | 100 | 5 | 5 | 5 | 3 | 0.5 | 90 |
| 10 | 2 | 2 | 100 | 4 | 4 | 4 | 6 | 0 | 90 |
| 11 | 3 | 3 | 100 | 5 | 5 | 5 | 8 | 0 | 85 |

On PA μ(7819.5), 0.3 percent SOF, cured 1.5 minutes at 160° C., the following results were obtained.

| | Initial | | | Bundesman | | | Ironing | | |
|---|---|---|---|---|---|---|---|---|---|
| Example | INOR | INWR | INSR | 1' | 5' | 10' | ABS | OR | SR |
| CE1 | 5 | 4 | 100 | 4 | 3 | 3 | 12 | 0 | 50 |
| CE2 | 5 | 4 | 100 | 4 | 3 | 3 | 20 | 0 | 50 |
| 1 | 2 | 4 | 100 | 5 | 5 | 5 | 5 | 0 | 90 |
| 2 | 3 | 2 | 90 | 4 | 3 | 3 | 12 | 1 | 70 |
| 3 | 4 | 3 | 100 | 5 | 4 | 4 | 12 | 0 | 70 |
| 4 | 4 | 4 | 100 | 5 | 4 | 4 | 10 | 0 | 50 |
| 6 | 4 | 3 | 100 | 3 | 2 | 1 | 34 | 0 | 70 |
| 7 | 4 | 4 | 100 | 4 | 3 | 2 | 26 | 0 | 0 |
| 8 | 5 | 3 | 100 | 4 | 3 | 2 | 15 | 1 | 80 |
| 9 | 5 | 3 | 100 | 5 | 4 | 3 | 11 | 0 | 75 |
| 10 | 2 | 3 | 100 | 1 | 1 | 1 | 31 | 0 | 75 |
| 11 | 2 | 3 | 100 | 2 | 2 | 2 | 29 | 1 | 70 |

On PES/Co (2681.5), 0.3 percent SOF, cured 1.5 minutes at 160° C., the following results were obtained.

| | Initial | | | Bundesman | | | Ironing | | |
|---|---|---|---|---|---|---|---|---|---|
| Example | INOR | INWR | INSR | 1' | 5' | 10' | ABS | OR | SR |
| CE1 | 4 | 4 | 60 | 1 | 1 | 1 | 100 | 0 | 0 |
| CE2 | 4 | 4 | 70 | 1 | 1 | 1 | 100 | 0 | 0 |
| 1 | 4 | 4 | 100 | 4 | 2 | 2 | 18 | 1 | 80 |
| 2 | 3 | 4 | 100 | 1 | 1 | 1 | 26 | 0 | 50 |
| 3 | 4 | 5 | 90 | 1 | 1 | 1 | 100 | 0.5 | 50 |
| 4 | 4 | 4 | 90 | 1 | 1 | 1 | 100 | 0 | 50 |
| 6 | 3 | 3 | 100 | 1 | 1 | 1 | 38 | 0 | 50 |
| 7 | 4 | 4 | 80 | 1 | 1 | 1 | 100 | 0 | 0 |
| 8 | 3 | 4 | 100 | 3 | 2 | 1 | 20 | 1 | 75 |
| 9 | 3 | 3 | 100 | 2 | 1 | 1 | 25 | 1 | 80 |
| 10 | 2 | 3 | 100 | 1 | 1 | 1 | 27 | 0 | 75 |
| 11 | 2 | 4 | 100 | 1 | 1 | 1 | 32 | 0 | 50 |

On Co (1511.1), 0.3 percent SOF, cured 1.5 minutes at 160° C., the following results were obtained.

|  | Initial | | | Ironing | |
| --- | --- | --- | --- | --- | --- |
| Example | INOR | INWR | INSR | OR | SR |
| CE1 | 2 | 4 | 50 | 0 | 0 |
| CE2 | 2 | 4 | 50 | 0 | 0 |
| 1 | 1 | 3 | 90 | 0 | 75 |
| 2 | 2 | 3 | 85 | 0 | 50 |
| 3 | 2 | 4 | 80 | 0 | 50 |
| 4 | 1 | 4 | 80 | 0 | 0 |
| 6 | 1 | 4 | 80 | 0 | 50 |
| 7 | 2 | 5 | 50 | 0 | 0 |
| 8 | 2 | 3 | 90 | 0 | 75 |
| 9 | 2 | 3 | 90 | 0 | 75 |
| 10 | 1 | 2 | 90 | 0 | 80 |
| 11 | 1 | 3 | 80 | 0 | 0 |

Additional samples were prepared in order to explore the performance of aromatic SPOL urethane derivatives where the ratio or composition of the hydrocarbon co-monomers in the spacer oligomers was varied with respect to the $C_4MH$ monomer. In most cases, these compositions were prepared in one reaction flask, where first the spacer oligomer was prepared, then the preparation of the urethane derivative was continued directly in the same flask without isolation of the spacer oligomer. The reactions are carried out at 40% solids in an organic solvent (e.g., MIBK, MEK) and subsequently post-emulsified in water using a combined cationic/nonionic emulsifier system (see experimental section).

| Aromatic SPOL Urethane Derivatives With Varying HC Co-Monomers Prepared Without Isolation of the SPOL | |
| --- | --- |
| Sample No. | Formulation (mole ratio) |
| 12 | SPOL 2/PAPI 27/MEKO (1:1:2) |
| 13 | SPOL 3/PAPI 27/MEKO (1:1:2) |
| 14 | SPOL 1/PAPI 27/MEKO (1:1:2) |
| 15 | SPOL 4/PAPI 27/MEKO (1:1:2) |
| 16 | SPOL 5/PAPI 27/MEKO (1:1:2) |
| 17 | SPOL 6/PAPI 27/MEKO (1:1:2) | where:
SPOL 1 = [$C_4MH$/ODA/$HSCH_2CH_2OH$], (4:2:1)
SPOL 2 = [$C_4MH$/ODA/$HSCH_2CH_2OH$], (2.68:1.32:1)
SPOL 3 = [$C_4MH$/ODA/$HSCH_2CH_2OH$], (1.32:2.68:1)
SPOL 4 = [$C_4MH$/ODA/BuMA/$HSCH_2CH_2OH$], (4:1:1:1)
SPOL 5 = [$C_4MH$/BuMA/$HSCH_2CH_2OH$], (4:2:1) and
SPOL 6 = [$C_4MH$/Lauryl MA/$HSCH_2CH_2OH$] (4:2:1).

Contact Angle Results On Aromatic Spol Urethane Derivatives

Results of the contact angle measurements are in the table below:

|  |  | Water Contact Angle | | Hex Contact Angle | |
| --- | --- | --- | --- | --- | --- |
| Example |  | Advancing | Receding | Advancing | Receding |
| 12 | Cycle 1 | 126 | 101 | 78 | 70 |
|  | Cycle 2 | 128 | 105 | 80 | 70 |
|  | Cycle 3 | 129 | 107 | 80 | 70 |
|  | Cycle 1 | 124 | 97 | 77 | 70 |
|  | Cycle 2 | 124 | 100 | 80 | 70 |
|  | Cycle 3 | 123 | 102 | 80 | 70 |
|  | Average | 126 | 102 | 79 | 70 |
| 13 | Cycle 1 | 123 | 95 | 76 | 69 |
|  | Cycle 2 | 123 | 94 | 80 | 69 |
|  | Cycle 3 | 124 | 93 | 80 | 69 |
|  | Cycle 1 | 120 | 92 | 76 | 70 |
|  | Cycle 2 | 118 | 90 | 80 | 70 |
|  | Cycle 3 | 117 | 81 | 80 | 70 |
|  | Average | 121 | 91 | 78 | 70 |
| 14 | Cycle 1 | 126 | 93 | 79 | 72 |
|  | Cycle 2 | 124 | 94 | 79 | 72 |
|  | Cycle 3 | 122 | 95 | 79 | 72 |
|  | Cycle 1 | 120 | 90 | 80 | 71 |
|  | Cycle 2 | 117 | 90 | 80 | 71 |
|  | Cycle 3 | 115 | 90 | 80 | 71 |
|  | Average | 121 | 92 | 80 | 71 |
| 15 | Cycle 1 | 123 | 88 | 82 | 72 |
|  | Cycle 2 | 117 | 87 | 82 | 72 |
|  | Cycle 3 | 116 | 87 | 82 | 72 |
|  | Cycle 1 | 118 | 89 | 82 | 70 |
|  | Cycle 2 | 114 | 88 | 82 | 70 |
|  | Cycle 3 | 113 | 88 | 82 | 70 |
|  | Average | 117 | 88 | 82 | 71 |
| 16 | Cycle 1 | 115 | 96 | 81 | 72 |
|  | Cycle 2 | 114 | 97 | 81 | 72 |
|  | Cycle 3 | 114 | 98 | 81 | 72 |
|  | Cycle 1 | 111 | 93 | 80 | 70 |
|  | Cycle 2 | 111 | 92 | 80 | 70 |
|  | Cycle 3 | 111 | 92 | 80 | 70 |
|  | Average | 112 | 97 | 80 | 71 |
| 17 | Cycle 1 | 106 | 87 | 80 | 72 |
|  | Cycle 2 | 111 | 85 | 80 | 72 |
|  | Cycle 3 | 103 | 84 | 80 | 72 |
|  | Cycle 1 | 114 | 97 | 80 | 71 |
|  | Cycle 2 | 114 | 97 | 80 | 71 |
|  | Cycle 3 | 114 | 99 | 80 | 71 |
|  | Average | 110 | 92 | 80 | 71 |

Initial performance results were obtained after 2+hours conditioning. Performance durability is measured after 5 launderings of the initially treated fabrics at 105° F., using standard detergent, followed by tumble drying at approximately 65° C. Performance results are illustrated in the following tables and graphs.

Substrate: Poly(amide) 0.6% SOF Curing: 2 minutes, 350 F.

| Example | IN OR | IN SP | 5L OR | 5L SP | 10L OR | 10L SP |
|---|---|---|---|---|---|---|
| 12 | 5 | 85 | 2 | 75 | 1 | 80 |
| 13 | 2 | 80 | 0 | 70 | 1 | 80 |
| 14 | 4 | 85 | 4 | 70 | | |
| 15 | 5 | 100 | 3 | 75 | | |
| 16 | 5 | 90 | 4 | 70 | | |
| 17 | 5 | 90 | 2 | 80 | | |

IN OR is initial oil repellency and IN SP is initial spray rating.

Substrate: Polyester 0.6% SOF Curing: 2 minutes, 350 F.

| Example | IN OR | IN SP | Bundesman | | | | 5L OR | 5L SP | 10L OR | 10L Sp |
|---|---|---|---|---|---|---|---|---|---|---|
| | | | 1 Min | 5 Min | 10 Min | ABS | | | | |
| 13 | 5 | 100 | 5 | 5 | 5 | 2 | 1 | 85 | 0 | 90 |
| 14 | 3 | 100 | 4 | 3 | 3 | 13 | 0 | 80 | 0 | 80 |
| 15 | 5 | 85 | | | | | 2 | 75 | | |
| 16 | 5 | 100 | 4 | 4 | 4 | 11 | 0 | 100 | | |
| 17 | 3 | 75 | | | | | 0 | 75 | | |
| 12 | 3 | 100 | 3 | 3 | 3 | 15 | 0 | 75 | | |

Additional samples were prepared where the substituents on the aromatic SPOL urethane were varied to include other substituents such as HFPO oligomer alcohol, urea linkages, C4 oligomer alcohols or stearyl alcohol or diols. A few of those examples are presented below:

Aromatic SPOL Urethane Derivatives With Varying Substituents on the Aromatic Isocyanate

| Sample No. | Formulation (mole ratio) |
|---|---|
| 18 | SPOL 4/PAPI 27/MEKO/stearyl alcohol (1:1:1.8:0.2) |
| 19 | SPOL 4/1.2 PAPI 27/2 MEKO/0.6[4MeFBSEA/HSCH$_2$CH$_2$OH] |
| 20 | SPOL 4/PAPI 27/MEKO/HFPO Oligomer alcohol (1:1.2:2:0.6) |
| 21 | SPOL 4/PAPI 27/MEKO/(9-Octadecene-1,18-diol) (1:1.06:2:0.1) | where
SPOL 4 = [4C$_4$MH/ODA/BuMA/HSCH$_2$CH$_2$OH]

where
SPOL 4 = [4 C$_4$MH/ODA/BuMA/HSCH$_2$CH$_2$OH]

Substrate: Poly(amide) 0.6% SOF Curing: 2 minutes, 350 F.

| Example | IN OR | IN SP | Bundesman | | | | 5L OR | 5L Sp |
|---|---|---|---|---|---|---|---|---|
| | | | 1 Min | 5 Min | 10 Min | Abs | | |
| 18 | 5 | 100 | 4 | 4 | 4 | 4 | 2 | 80 |
| 19 | 5 | 100 | 4 | 4 | 4 | 6 | 4 | 95 |
| 20 | 5 | 100 | 4 | 4 | 4 | 5 | 4 | 80 |
| 21 | 5 | 100 | 4 | 4 | 4 | 8 | 3 | 90 |

Substrate: Polyester 0.6% SOF Curing: 2 minutes, 350 F.

| Example | IN OR | IN SP | Bundesman | | | | 5L OR | 5L SP | 10L OR | 10L SP |
|---|---|---|---|---|---|---|---|---|---|---|
| | | | 1 Min | 5 Min | 10 Min | ABS | | | | |
| 18 | 3 | 100 | 4 | 4 | 4 | 3 | 1 | 90 | | |
| 19 | 3 | 90 | | | | | 2 | 80 | | |
| 20 | 2 | 100 | 3 | 2 | 2 | 12 | 1 | 85 | | |
| 21 | 4 | 100 | 5 | 5 | 5 | 8 | 1 | 100 | 1 | 100 |

Additional samples of aromatic SPOL urethane derivatives were prepared where the comonomer is a hydrophilic monomer like vinyl pyrrolidinone or vinyl caprolactam. The following examples further illustrate the invention:

Aromatic SPOL Urethane Derivatives With Hydrophilic Co-Monomers in the SPOL

| Sample No. | Formulation (mole ratio) |
|---|---|
| 22 | C$_4$MH/ODA/mercaptoethanol/1-vinyl-2-pyrrolidone/papi 27/MEKO (4:1:1:1:1:1) |
| 23 | C$_4$MH/ODA/mercaptoethanol/N-vinylcaprolactan/PAP 27/MEKO (4:1:1:1:1:1) |
| 24 | C$_4$MH/mercaptoethanol/1-vinyl-2-pyrrolidone/papi 27/MEKO (4:1:2:1:1) |
| 25 | C$_4$MH/mercaptoethanol/N-vinylcaprolactan/PAP 27/MEKO (4:1:2:1:1) |

| | | | Nylon Bundesman | | | | | 5L | 10L | 10L |
|---|---|---|---|---|---|---|---|---|---|---|
| Example | IN OR | IN SP | 1 Min | 5 Min | 10 Min | ABS | 5L OR | SP | OR | SP |
| 22 | 4 | 100 | 5 | 5 | 5 | 7 | 1 | 85 | 0 | 70 |
| 23 | 4 | 100 | 5 | 5 | 5 | 4 | 2 | 90 | 1 | 70 |
| 24 | 3 | 100 | 4 | 4 | 4 | 3 | 1 | 80 | 0 | 70 |
| 25 | 4 | 100 | 4 | 4 | 4 | 6 | 1 | 85 | 0 | 75 |

| | | | Polyester Bundesman | | | | | | | |
|---|---|---|---|---|---|---|---|---|---|---|
| Example | IN OR | IN SP | 1 Min | 5 Min | 10 Min | ABS | 5L OR | 5L SP | 10L OR | 10L SP |
| 22 | 3 | 100 | 5 | 5 | 5 | 3 | 1 | 95 | 0 | 75 |
| 23 | 3 | 100 | 5 | 5 | 5 | 2 | 1 | 85 | 0 | 80 |
| 24 | 3 | 100 | 4 | 4 | 4 | 6 | 1 | 80 | 0 | 75 |
| 25 | 3 | 100 | 5 | 5 | 5 | 4 | 1 | 80 | 0 | 75 |

C$_4$MH monomer and C$_6$F$_{13}$CH$_2$CH$_2$O-MDI-HEA monomer may be prepared as described in US 2005/0143541 A1, which is incorporated herein by reference in its entirety with C$_6$F$_{13}$CH$_2$CH$_2$OH (Clariant) used in place of C$_4$F$_9$CH$_2$CH$_2$OH.

1. Synthesis Spacer-Oligomer Alcohol FC-1 (Example CE-1):

4 C$_4$MH-2 ODA-HSCH$_2$CH$_2$OH

A 250 ml polymerization bottle was charged with 57.8 g L-18972 (C$_4$MH; 80 meq.), 12.96 g ODA (from Osaka Ltd; 40 meq.), 1.56 g 2-mercapto ethanol (20 meq.), 108.5 g MIBK and 0.217 g V-59. The mixture was repeatedly degassed using water jet vacuum, followed by breaking the vacuum with nitrogen atmosphere. The polymerization bottle was sealed and shaken at 200 rpm until all monomers were dissolved. The polymerization was then run for 3 hrs at 75° C. in a pre-heated Launder-o-meter. Another 0.217 g V-59 was added and after degassing and sealing the reaction was run for another 3 hrs at 75° C. Then 0.434 g LPO was added and after degassing and sealing the reaction was continued overnight at 75° C. A hazy 40% solution was obtained with 97% C$_4$MH monomer conversion. MIBK was stripped of with a Büchi rotary evaporator using waterjet vacuum. The solids were further dried in a forced air oven at 75° C. overnight.

2. Synthesis Spacer-Oligomer Diol FC-2 (Example CE-2)

4 C$_4$MH-2 ODA-HSCH$_2$CHOHCH$_2$OH

A 250 ml polymerization bottle was charged with 28.9 g L-18972 (C$_4$MH; 40 meq.), 6.48 g ODA (from Osaka Ltd; 20 meq.), 1.08 g 3-mercapto 1,2-propane diol (10 meq.), 54.7 g MIBK and 0.109 g V-59. The mixture was repeatedly degassed using water jet vacuum, followed by breaking the vacuum with nitrogen atmosphere. The polymerization bottle was sealed and shaken at 200 rpm until all monomers were dissolved. The polymerization was then run for 3 hrs at 75° C. in a pre-heated Launder-o-meter. Another 0.109 g V-59 was added and after degassing and sealing the reaction was run for another 3 hrs at 75° C. Then 0.219 g LPO was added and after degassing and sealing the reaction was continued overnight at 75° C. A hazy 40% solution was obtained. MIBK was stripped of with a Büchi rotary evaporator using waterjet vacuum. The solids were further dried in a forced air oven at 75° C. overnight.

2.A. Synthesis Spacer-Oligomer Alcohol (SPOL 2) Used in Example 12 Below 2.68 C$_4$MH-1.32 ODA-HSCH$_2$)CH$_2$OH A 250 ml 3-necked reaction flask equipped with a magnetic stirrer, heating mantle, thermometer, condenser and nitrogen inlet was charged with 79.28 g C$_4$MH (11 meq), 17.53 g ODA (from Osaka Ltd; 54 meq), and 75 g ethyl acetate. The flask was degassed using water jet vacuum three times, each time breaking the vacuum with nitrogen atmosphere. Next, 3.20 g (41 meq) 2-mercaptoethanol was added. The mixture was heated to 75° C., followed by addition of 0.4 grams VAZO 67. Let run overnight. An additional charge of 0.2 g VAZO 67 was added, followed by an additional 8 hours reaction at 75° C. The product was cooled then transferred to a crystallizing dish and dried overnight in air. The product was isolated as a solid and ground into a powder with a mortar and pestle.

3. Synthesis Spacer-Oligomer Urethane FC-3 (Sample 10)

(4 C$_4$MH-2 ODA-HSCH$_2$CH$_2$OH)/1.2 Voranate M220/2.6 MEKO

Dry FC-1 alcohol (278.3 g; 77 meq.) and 548 g MEK were charged in a 2 liter 3-neck flask equipped with a mechanical stirrer, heating mantle, thermometer, Dean Stark condenser and nitrogen inlet. 50 g MIBK/H$_2$O azeotrope was distilled off via the Dean Stark condenser. After replacing the Dean Stark by a normal reflux condenser, the mixture was cooled to 65° C. and 37.38 g Voranate M-220 (277 meq.) was added. The reaction mixture was heated for 2 hrs at 75° C., cooled to 65° C. and 16.06 g MEKO (185 meq) was added with a syringe. After running the reaction for 30' at 75° C., 1.61 g additional MEKO (18.5 meq.) was added. The reaction was continued overnight at 50° C., yielding an almost clear light brown solution. FTIR analysis indicated complete conversion.

4. Emulsification FC-3

The FC-3 reaction mixture was emulsified as follows: 820 g FC-3 urethane solution (328 g solids) was heated to 65° C. and gradually added to a hot solution of ETHOQUAD™ C-12 (2% on solids), TERGITOL™ 15S30 (3% on solids) and TERGITOL™ TMN-6 (5.4% on solids) in 1358 g water saturated with MEK, while stirring. The mixture was emulsified with a 2 stage lab Manton-Gaulin homogenizer at 250/20 bar (2 passes). The solvent was stripped off with a Büchi evaporator, using water jet vacuum. A stable, milky dispersion was obtained (20.1% solids).

Examples 2, 3, 4, 5, 6, 9, and 10 were made according to a procedure analogous to recipe FC-3, except with MIBK instead of MEK and using the weights (g) from following table

|   | FC-1 | FC-2 | Voranate M-220 | MEKO | 2-ethyl hexanol | solvent weight |
|---|------|------|----------------|------|-----------------|----------------|
| 2 | 7.2  |      | 0.41           | 0.09 |                 | 11.6           |
| 3 | 6.0  |      | 0.68           | 0.15 | 0.22            | 10.6           |
| 4 | 6.0  |      | 0.68           |      | 0.43            | 10.7           |
| 5 | 6.0  |      | 0.90           | 0.44 |                 | 11.0           |
| 6 | 6.0  |      | 1.13           | 0.58 |                 | 11.6           |
| 9 |      | 6.1  | 1.35           | 0.73 |                 | 12.2           |
| 10|      | 6.1  | 1.35           |      | 1.08            | 12.8           |

5. Synthesis Spacer-Oligomer Urethane FC-4 (Example 7)

$C_4MH$-2 ODA-$HSCH_2CH_2OH$)/Desmodur N3300/2 MEKO

Dry FC-1 alcohol (6.0 g; 1.67 meq.) and 10.7 g MIBK were heated to 65° C. in a reaction vessel. After addition of 0.84 g Desmodur N3300 (5 meq.) the reaction was run for 2 hrs at 75° C. The mixture was cooled to 65° C. and 0.29 MEKO (3.3 meq.) was added with a syringe. The reaction was continued overnight at 70° C., yielding a hazy solution. FTIR analysis indicated complete conversion.

5A. Synthesis Spacer-Oligomer Urethane (Example 12)

(2.68 $C_4MH$-1.32 ODA-$HSCH_2CH_2OH$)/1.0 PAPI 27/2 MEKO

Dry SPOL 2 (40.46 g; 16.5 meq.), 6.65 g PAPI 27 (49.6 meq), 0.15 ml of a 10% dibutyl tin dilaurate solution (in ethyl acetate) and 200 g ethyl acetate were charged in a 250 ml 3-neck flask equipped with a magnetic stirrer, heating mantle, condenser, thermometer and nitrogen inlet. The reaction mixture was heated for 3 hrs at 74° C. Next, 2.88 g MEKO (33 meq) was added. The reaction was continued overnight. The solution was clear at reaction temperature.

5B. Emulsification Example 12

The reaction mixture was emulsified as follows: 125 g 2-69 urethane solution (25 g solids) was removed from the above batch while still hot (~65° C.) and placed in a 500 ml Erlenmeyer flask, with stirring and heating on a hot plate. A mixture of surfactant solution was gradually added to the hot stirring reaction mixture, where the surfactant solution consisted of ETHOQUAD™ C-12 (2% on solids), TERGITOL™ 15S30 (3% on solids) and TERGITOL™ TMN-6 (5.4% on solids) in 125 g deionized water. The mixture was sonified 5 minutes using a Cole Parmer lab ultrasonicator. The ethyl acetate was removed using a rotary evaporator with water jet vacuum. An opaque dispersion (118 grams) was obtained at 19.3% solids.

6. Synthesis Spacer-Oligomer Urethane FC-5 (Example 6)

$4C_4MH$-2 ODA-$HSCH_2CH_2OH$)/Desmodur N3300/22EH

Dry FC-1 alcohol (6.0 g; 1.67 meq.) and 11.0 g MIBK were heated to 65° C. in a reaction vessel. After addition of 0.84 g DESMODUR™ N3300 (5 meq.) the reaction was run for 2 hrs at 75° C. The mixture was cooled to 65° C. and 0.43 g 2-ethylhexanol (3.3 meq.) was added with a syringe. The reaction was continued overnight at 70° C., yielding a hazy solution. FTIR analysis indicated complete conversion.

6A. In-Situ Synthesis Spacer-Oligomer Urethanes (Examples 13-17)

The urethanes of Examples 13-17 were made according to the procedure for FC-5 with a 1:1:2 mole ratio of functional oligomer: PAPI 27: MEKO, where the functional oligomer composition prepared in Step 1 had the mole ratios shown below:

13 $C_4MH$/ODA/$HSCH_2CH_2OH$ (1.32 2.68:1)
14 $C_4MH$/ODA/$HSCH_2CH_2OH$ (4:2:1)
15 $C_4MH$/BuMA/$HSCH_2CH_2OH$ (4:2:1)
16 $C_4MH$/Lauryl MA/$HSCH_2CH_2OH$ (4:2:1)
17 $C_4MH$/ODA/MeFBSEA/$HSCH_2CH_2OH$ (4:1:1:1)

6B. In-Situ Synthesis Spacer-Oligomer Urethanes (Examples 18-21)

The urethanes of examples 18-21 were made according to the procedure for FC-5 except an additional functional organic group, R', was reacted with the PAPI 27 where the mole ratios of [Functional oligomer: PAPI 27: MEKO: R'] were as noted below, where in each case the SPOL 4 (functional oligomer) had the composition [4 $C_4MH$/ODA/BuMA/$HSCH_2CH_2OH$].

18 SPOL 4/PAPI 27/MEKO/stearyl alcohol (1:1:1.8:0.2)
19 SPOL 4/PAPI 27/MEKO/[4MeFBSEA/$HSCH_2CH_2OH$] (1:1.2:2:0.6)
20 SPOL 4/PAPI 27/MEKO/HFPO Oligomer alcohol (1:1.2:2:0.6)
21 SPOL 4/PAPI 27/MEKO (9-Octadecene-1,18-diol) (1:1.06:2:0.1)

In each case the R' component was added at the beginning of Step 2 of the procedure, along with the MIBK solvent and prior to the azeotropic distillation step.

6C. In-Situ Synthesis Spacer-Oligomer Urethane Sample $4C_6F_{13}CH_2CH_2OH$-MDI-HEA/2ODA/$HSCH_2OH$)/1.2 PAPI 27/2.6 MEKO Step 1: Synthesis of Functional oligomer

4 $C_6F_{13}CH_2CH_2O$-MDI-HEA/2ODA/$HSCH_2CH_2OH$

A 250 ml 3-necked reaction flask equipped with a magnetic stirrer, heating mantle, thermometer, condenser and nitrogen inlet was charged with 16.08 g (22 meq) $C_6F_{13}CH_2CH_2O$-MDI-HEA monomer, 3.58 g (11 meq) ODA (from Osaka Ltd) and 37 g ethyl acetate. The flask was degassed and nitrogen filled three times using water jet vacuum. Next, 0.43 g (5.5 meq) 2-mercaptoethanol was added. The mixture was heated to 75° C., followed by addition of 0.06 grams VAZO 67. After 4 to 6 hours, an additional charge of 0.05 grams VAZO 67 was made. The reaction was allowed to proceed overnight.

Step 2: Synthesis of Urethane from functional oligomer

The reaction was continued the next day with the addition of 75 g ethyl acetate, of which 65 mL was removed via azeotropic distillation with the use of a Dean Stark trap. After distillation, the reaction mixture was cooled to 40° C. and PAPI 27 (2.66 g, 19.8 meq) was added. The reaction mixture was brought back to 75° C., followed by addition of 0.1 mL of a 10% dibutyl tin dilaurate solution in ethyl acetate. The reaction was allowed to run 3 hours. MEKO (1.25 g, 14.3 meq) was added and the reaction was left to run an additional 2 hours. FTIR analysis indicated complete reaction of the isocyanate groups. A small portion of the reaction mixture (~5 ml) was removed for contact angle studies.

Step 3: Emulsification of Spacer-Oligomer Urethane

The remaining reaction mixture was emulsified by slowly adding a 75° C. solution of ETHOQUAD™ C-12 (2% on solids), TERGITOL™ 15S30 (3% on solids) and TERGITOL™ TMN-6 (5.4% on solids) in 96 g deionized water to the hot ethyl acetate urethane solution The mixture was sonified 5 minutes using a Cole Parmer lab ultrasonicator. The ethyl acetate was removed using a rotary evaporator with water jet vacuum. A milky dispersion was obtained at 19.6% solids.

Oligomers

CJ-1: The oligomer used in the urethane 22 was made in identical way as FC-1 except the ratios of the monomers used were $(C_4MH)_4(ODA)1$ (1-vinyl pyrrilidinone)1-$HSCH_2CH_2OH$ and the initiator was VAZO-69.

CJ-2: The oligomer used in the urethane 23 was made in identical way as FC-1 except the ratios of the monomers used were $(C_4MH)4(ODA)1$(1-vinyl caprolactam)1-$HSCH_2CH_2OH$ and the initiator was VAZO-69.

CJ-3: The oligomer used in the urethane 24 was made in identical way as FC-1 except the ratios of the monomers used were $(C_4MH)4$(1-vinyl pyrrilidinone)2-$HSCH_2CH_2OH$ and the initiator was VAZO-69.

CJ-4: The oligomer used in the urethane 25 was made in identical way as FC-1 except the ratios of the monomers used were $(C_4MH)_4$(1-vinyl caprolactam)2-$HSCH_2CH_2OH$ and the initiator was VAZO-69.

Urethanes

The synthetic & emulsification procedures were as follows.

Urethane 22

The synthetic procedure was identical to the urethane FC-3, VORANATE M220 was replaced with PAPI 27 and FC-1 oligomer was replaced with CJ-1.

Urethane 23

The synthetic procedure was identical to the urethane FC-3, VORANATE™ M220 was replaced with PAPI 27 and FC-1 oligomer was replaced with CJ-2.

Urethane 24

The synthetic procedure was identical to the urethane FC-3 VORANATE™ M220 was replaced with PAPI 27 and FC-1 oligomer was replaced with CJ-3.

Urethane 25

The synthetic procedure was identical to the urethane FC-3, VORANATE™ M220 was replaced with PAPI 27 and FC-1 oligomer was replaced with CJ-4.

Examples

Aqueous dispersions of the products of the invention and reference products are applied on PES, PES-CO, and Nylon test fabrics via pad-application at 0.6% SOF, followed by 1.5 min curing at 160° C.

Initial performance results are obtained after 24 conditioning. Performance durability is measured after 5 or more launderings of the initially treated fabrics at 40° C., using standard detergent.

Detailed Procedures for Selected Examples: Preparation of $C_4$ MH/PEGDA-700 (90/10) at 20% Solids A 1 liter bottle was charged with 246 g $C_4$ MH solution (36.6% solid, 90 g solid, MW=723, 124.5 mmol) in ethyl acetate (EtOAc), 10 g polyethylene glycol diacrylate with molecular weight ~700 (PEGDA-700), 244 g additional EtOAc and 1.0 g Vazo-67. A magnetic stir bar was added. The solution was bubbled with nitrogen for two minutes. The sealed bottle was put in a 70° C. oil bath and polymerized with a magnetic stirring for 24 hours. The obtained 20% solid polymer solution was a clear solution without gelation at 70° C. Some polymer crystallization occurred when cooled to room temperature. The crystallized polymer was re-dissolved by simply heating the solution or adding a polar solvent such as N,N-dimethylformamide (DMF) or N-methylpyrrolidone (NMP). HPLC analysis of the solution shows that Mn ~11,300, Mw ~121,000, and Mw/Mn=1.02. The polymer was emulsified in the presence of 5% ARQUAD™ 12/50 for evaluation.

Representative Example for the Preparation of Urethane-Containing Polyacrylate, C4MDI-HEA/CN992 (90/10, 2-12B):

In an 8 oz bottle, charged with 25 g solution of $C_4$MDIHEA (MW=723, 62.24 mmol) in EtOAc solution (~36% wt, 9.0 g solid), 1.0 g CN992 (Aromatic polyester based urethane diacrylate oligomer, available from Sartomer), 1%), 24 g EtOAc and 0.15 g Vazo-67. A magnetic stir bar was added, and the solution was bubbled with nitrogen for two minutes. The sealed bottle was put in a 70° C. oil bath and polymerized with a magnetic stirring for 24 hours. The obtained solution with 20% solid was clear at 70° C., and turned into cloudy at room temperature.

All polymers are diluted with 5% DMF and EtOAc to 5% for contact angle measurement.

The polymer was emulsified in the presence of 5% ARQUA™12/50 for textile evaluation.

Contact Angle Data
Contact Angle data of Urethane-Containing Polyacrylates

| Formulation | Contact Angle | | Contact Angle | |
|---|---|---|---|---|
| | Adv. Water | Rec. Water | Adv. Water | Rec. Water |
| $C_4$MH/CN978/HSC$_2$H$_4$OH-PAPI(MEKO)2 (95/5) | 121 | 88 | 76 | 56 |
| $C_4$MH/CN978/ODA/HSC$_2$H$_4$OH-PAPI(MEKO)2 (90/5/5) | 123 | 100 | 76 | 61 |
| $C_4$MH/CN978/ODA/HSC$_2$H$_4$OH-PAPI(MEKO)2 (85/5/10) | 109 | 78 | 69 | 53 |

-continued

Contact Angle Data
Contact Angle data of Urethane-Containing Polyacrylates

| Formulation | Contact Angle Adv. Water | Contact Angle Rec. Water | Contact Angle Adv. Water | Contact Angle Rec. Water |
|---|---|---|---|---|
| $C_4MH/CN992/HSC_2H_4OH-PAPI(MEKO)2$ (90/10) | 107 | 88 | 81 | 67 |
| $C_4MH/CN992/HSC_2H_4OH-PAPI(MEKO)2$ (95/5) | 108 | 88 | 84 | 70 |
| $C_4MH/CN992/ODA/HSC_2H_4OH-PAPI(MEKO)2$ (90/5/5) | 107 | 87 | 80 | 65 |
| $C_4MH/CN992/ODA/HSC_2H_4OH-PAPI(MEKO)2$ (85/5/10) | 105 | 85 | 81 | 64 |

Performance Data on Textiles
Initial Performance on Nylon

| Nylon (0.227% absorption) Composition | INIT O/R | INIT SPRAY | BUNDESMAN 1 MIN | BUNDESMAN 5 MIN | BUNDESMAN 10 MIN | TOTAL | ABS (%) |
|---|---|---|---|---|---|---|---|
| $C_4MH/CN978/HSC_2H_4OH-PAPI(MEKO)2$ (90/10) | 6 | 100 | 3 | 3 | 3 | 9 | 6 |
| $C_4MH/CN978/HSC_2H_4OH-PAPI(MEKO)2$ (95/5) | 6 | 100 | 3 | 3 | 3 | 9 | 8 |
| $C_4MH/CN978/ODA/HSC_2H_4OH-PAPI(MEKO)2$ (90/5/5) | 5 | 100 | 4 | 4 | 4 | 12 | 4 |
| $C_4MH/CN978/ODA/HSC_2H_4OH-PAPI(MEKO)2$ (85/5/10) | 6 | 100 | 4 | 4 | 4 | 12 | 6 |
| $6C_4MH/1PEGDA/1ODA/HSC_2H_4OH-PAPI(MEKO)2$ | 3 | 100 | 4 | 3 | 3 | 10 | 7 |

Durability Performance on Nylon

| Nylon (0.227% absorption) Composition | INIT O/R | INIT SPRAY | 5L | 5L | 10L | 10L | 20L | 20L |
|---|---|---|---|---|---|---|---|---|
| $C_4MH/CN978/HSC_2H4OH-PAPI(MEKO)2$ (90/10) | 6 | 100 | 4 | 75 | | | | |
| $C_4MH/CN978/HSC_2H_4OH-PAPI(MEKO)2$ (95/5) | 5.5 | 100 | 4 | 75 | | | | |
| $C_4MH/CN978/ODA/HSC_2H_4OH-PAPI(MEKO)2$ (90/5/5) | 5 | 100 | 5 | 85 | 2 | 80 | 0 | 60 |
| $C_4MH/CN978/ODA/HSC2_4OH-PAPI(MEKO)2$ (85/5/10) | 6 | 100 | 5 | 85 | 2 | 80 | 0 | 50 |
| $6C_4MH/1PEGDA/1ODA/HSC_2H_4OH-PAPI(MEKO)2$ (80/15/5) | 3 | 100 | 2 | 0 | | | | |

Initial Performance on PES

| PES (0.648% absorption) Composition | INIT O/R | INIT SPRAY | BUNDESMAN 1 MIN | BUNDESMAN 5 MIN | BUNDESMAN 10 MIN | TOTAL | ABS (%) |
|---|---|---|---|---|---|---|---|
| $C_4MH/CN978/HSC_2H_4OH-PAPI(MEKO)2$ (90/10) | 5 | 100 | 4 | 4 | 4 | 12 | 1 |
| $C_4MH/CN978/HSC2H_4OH-PAPI(MEKO)2$ (95/5) | 5 | 100 | 4 | 4 | 4 | 12 | 0 |
| $C_4MH/CN978/ODA/HSC_2H_4OH-PAPI(MEKO)2$ (90/5/5) | 5 | 100 | 4 | 4 | 4 | 12 | 2 |
| $C_4MH/CN978/ODA/HSC_2H_4OH-PAPI(MEKO)2$ (85/5/10) | 6 | 100 | 4 | 4 | 4 | 12 | 6 |
| $6C_4MH/1PEGDA/1ODA/HSC_2H_4OH-PAPI(MEKO)2$ | 3 | 100 | 4 | 3 | 3 | 10 | 7 |

| Durability Performance on PES | | | | | | | | |
|---|---|---|---|---|---|---|---|---|
| PES (0.648% absorption) Composition | INIT O/R | INIT SPRAY | 5L | 5L | 10L | 10L | 20L | 20L |
| C₄MH/CN978/HSC₂H₄OH-PAPI(MEKO)2 (90/10) | 6 | 100 | 2 | 85 | 1 | 80 | 0 | 75 |
| C₄MH/CN978/HSC₂H₄OH-PAPI(MEKO)2 (95/5) | 6 | 100 | 2 | 75 | | | | |
| C₄MH/CN978/ODA/HSC₂H4OH-PAPI(MEKO)2 (90/5/5) | 5 | 100 | 1 | 80 | 1 | 80 | 0 | 75 |
| C₄MH/CN978/ODA/HSC₂H₄OH-PAPI(MEKO)2 (85/5/10) | 6 | 100 | 2 | 85 | 1 | 85 | 0 | 80 |
| 6C₄MH/1PEGDA/1ODA/HSC₂H₄OH-PAPI(MEKO)2 | 3 | 100 | 2 | 75 | | | | |

In conclusion, urethane-containing polyacrylates not only show good initial performance for textiles, but also significantly improved durability to multiple launderings, in comparison with non-urethane containing polyacrylates.

Various modifications and alteration to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A fluorochemical polyurethane compound prepared by reacting:
   (a) a fluorochemical spacer oligomer comprising the oligomerization product of fluorochemical spacer monomers alone or in combination with other polymerizable monomers in the presence of at least one functionalized chain transfer agent
   (b) a di-, tri-, or tetravalent isocyanate or combinations thereof,
   (c) optionally, at least one isocyanate-reactive group and/or blocking group, and,
   (d) optionally, at least one multi-functional chain extender; wherein the fluorochemical spacer monomers are represented by the following formula:

$C_nF_{2n+1}$—X'—OC(O)NH-A"-HNC(O)O—$(C_pH_{2p})$(O)COC(R')=CH$_2$ wherein
   n is 4;
   X' is

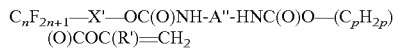

m is 2 to 4;
   A" is

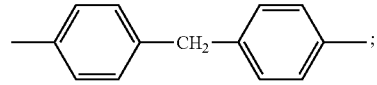

R' is H, CH$_3$, or F; and
   p is 2.

2. A fluorochemical polyurethane compound represented by formula (I):

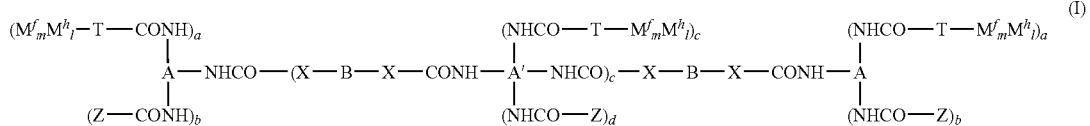

wherein
   $M^f_m M^h_l$ is a fluorochemical spacer oligomer, comprising m units derived from a fluorochemical spacer monomer and l units derived from a polymerizable monomer, wherein the fluorochemical monomers and polymerizable spacer monomers may be the same or different;
   m is a number from 2 to 40, inclusive;
   l is a number from 0 to 20, inclusive;
   T is an organic linking group obtained by removing a hydrogen atom from a chain transfer agent, and the T residues may be the same or may be different;
   Z is the residue obtained by removing a hydrogen atom from an organic masking or blocking group, and the Z residues may be the same or may be different;
   A is a di-, tri-, or tetravalent residue obtained by removing 2, 3, or 4 —NCO groups from a corresponding isocyanate, and the A residues may be the same or may be different;
   B is a divalent organic residue obtained by removing the two X—H groups from a difunctional active hydrogen compound HX—B—XH, wherein X is O, NH, or S, and the B residues may be the same or may be different;
   a is a number from 1 to 3, inclusive, and b is a number from 0 to 2, inclusive, with the proviso that a+b has a value from 1 to 3, inclusive;
   c is a number from 0 to 30 inclusive;

d and e are numbers from 0 to 2, inclusive, with the proviso that d+e is not greater than 2; and, wherein $M^f$ is a fluorochemical spacer monomer represented by the following formula:

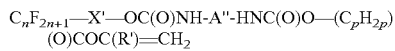

wherein
n is 4;
X' is

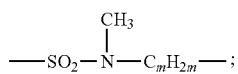

m is 2 to 4;
A" is

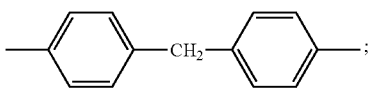

R' is H, $CH_3$, or F; and
p is 2.

3. A fluorochemical polyurethane compound represented by formula (I):

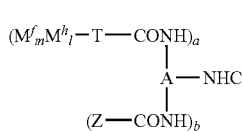 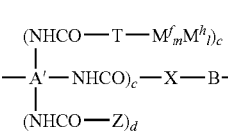 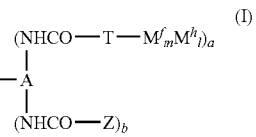  (I)

wherein
$M^f_m M^h_l$ is a fluorochemical spacer oligomer, comprising m units derived from a fluorochemical spacer monomer and l units derived from a polymerizable monomer, wherein the fluorochemical monomers and polymerizable spacer monomers may be the same or different;
m is a number from 2 to 40, inclusive;
l is a number from 0 to 20, inclusive;
T is an organic linking group obtained by removing a hydrogen atom from a chain transfer agent, and the T residues may be the same or may be different;
Z is the residue obtained by removing a hydrogen atom from an organic masking or blocking group, and the Z residues may be the same or may be different;
A is a di-, tri-, or tetravalent residue obtained by removing 2, 3, or 4 —NCO groups from a corresponding isocyanate, and the A residues may be the same or may be different;
B is a divalent organic residue obtained by removing the two X—H groups from a difunctional active hydrogen compound HX—B—XH, wherein X is O, NH, or S, and the B residues may be the same or may be different;
a is a number from 1 to 3, inclusive, and b is a number from 0 to 2, inclusive, with the proviso that a+b has a value from 1 to 3, inclusive;
c is a number from 0 to 30 inclusive;
d and e are numbers from 0 to 2, inclusive, with the proviso that d+e is not greater than 2; and, wherein $M^h$ is selected from the group consisting of octadecylacrylate, octadecylmethacrylate, 1,4-butanediol diacrylate, polyreuthane diacrylates, polyethylene glycol diacrylates, polypropylene glycol diacrylates, laurylmethacrylate, butylacrylate, N-methylol acrylamide, isobutylmethacrylate, ethylhexyl acrylate, ethylhexyl methacrylate, vinylchloride and vinylidene chloride.

4. A fluorochemical polyurethane compound represented by formula (III):

   (II)

wherein:
-$M^f_m M^h_l$ is a fluorochemical spacer oligomer, comprising m units derived from a fluorochemical spacer monomer, $M^f$, and l units derived from one or more other polymerizable monomers, $M^h$, that may be fluorinated or fluorine-free, wherein the fluorochemical spacer monomers and polymerizable monomers may be the same or different;
m is a number from 2 to 40, inclusive;
l is a number from 0 to 20, inclusive;
T is an organic linking group obtained by removing a hydrogen atom from a chain transfer agent, and the T residues may be the same or may be different;
Z is a residue obtained by removing a hydrogen atom from an isocyanate-reactive group or blocking group, and the Z residues may be the same or may be different;
A is a di- tri- or tetravalent residue obtained by removing 2, 3, or 4 —NCO groups from a corresponding isocyanate;
a is a number from 1 to 4, inclusive, and b is a number from 0 to 3, inclusive, with the proviso that a+b has a value from 2 to 4; and, wherein $M^f$ is a fluorochemical spacer monomer represented by the following formula:

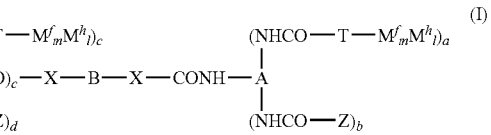

wherein
n is 4;
X' is

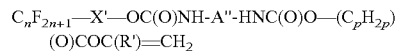

m is 2 to 4;

A" is

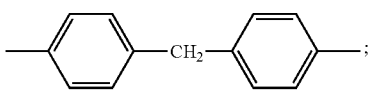

R' is H, $CH_3$, or F; and p is 2.

5. A fluorochemical polyurethane compound represented by formula (III):

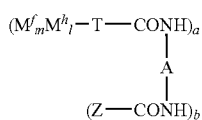

wherein:
- $-M^f_m M^h_l$ is a fluorochemical spacer oligomer, comprising m units derived from a fluorochemical spacer monomer, $M^f$, and l units derived from one or more other polymerizable monomers, $M^h$, that may be fluorinated or fluorine-free, wherein the fluorochemical spacer monomers and polymerizable monomers may be the same or different;
- m is a number from 2 to 40, inclusive;
- l is a number from 0 to 20, inclusive;
- T is an organic linking group obtained by removing a hydrogen atom from a chain transfer agent, and the T residues may be the same or may be different;
- Z is a residue obtained by removing a hydrogen atom from an isocyanate-reactive group or blocking group, and the Z residues may be the same or may be different;
- A is a di- tri- or tetravalent residue obtained by removing 2, 3, or 4 —NCO groups from a corresponding isocyanate;
- a is a number from 1 to 4, inclusive, and b is a number from 0 to 3, inclusive, with the proviso that a+b has a value from 2 to 4; and,
  - wherein $M^h$ is selected from the group consisting of octadecylacrylate, octadecylmethacrylate, 1,4-butanediol diacrylate, polyreuthane diacrylates, polyethylene glycol diacrylates, polypropylene glycol diacrylates, laurylmethacrylate, butylacrylate, N-methylol acrylamide, isobutylmethacrylate, ethylhexyl acrylate, ethylhexyl methacrylate, vinylchloride and vinylidene chloride.

* * * * *

UNITED STATES PATENT AND TRADEMARK OFFICE
CERTIFICATE OF CORRECTION

PATENT NO. : 7,750,093 B2
APPLICATION NO. : 11/478219
DATED : July 6, 2010
INVENTOR(S) : Cheryl S Elsbernd Page 1 of 2

It is certified that error appears in the above-identified patent and that said Letters Patent is hereby corrected as shown below:

In the Specifications:

Column 3
Line 35; Delete "group containing" and insert -- group-containing --, therefor.

Column 6
Line 18-19; Delete "$C_2F_5SO2NCH3(CH2)4OH$," and insert -- $C_2F_5SO_2NCH_3(CH_2)_4OH$, --, therefor.

Column 9
Line 13; Delete "polyreuthane" and insert -- polyurethane --, therefor.
Line 16; Delete "methacylate," and insert -- methacrylate, --, therefor.

Column 10
Line 17; Delete "napthols," and insert -- naphthols, --, therefor.

Column 11
Line 12; Delete "(CH3)CH2CH(OH)CH2OH;" and insert -- $(CH_3)CH_2CH(OH)CH_2OH$; --, therefor.
Line 47; Delete "cahin" and insert -- chain --, therefor.
Line 47; Delete "alkylenethio-" and insert -- alkylenethiol- --, therefor.

Column 15
Line 3; Delete "150 C." and insert -- 150° C. --, therefor.

Column 18
Line 62; Delete "2+hours" and insert -- 2+ hours --, therefor.

Column 25
Line 20; Delete "pyrrilidinone)" and insert -- pyrrolidinone) --, therefor.
Line 29; Delete "pyrrilidinone)" and insert -- pyrrolidinone) --, therefor.

Signed and Sealed this
Twenty-third Day of April, 2013

Teresa Stanek Rea
*Acting Director of the United States Patent and Trademark Office*

CERTIFICATE OF CORRECTION (continued)
U.S. Pat. No. 7,750,093 B2

In the Claims:

Column 29-30

Line 36-40; Claim 2, delete " 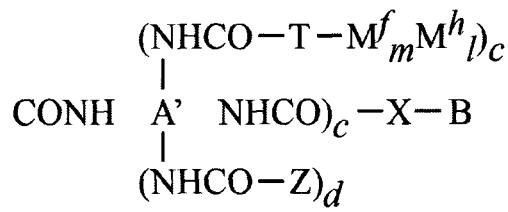 " and insert -- 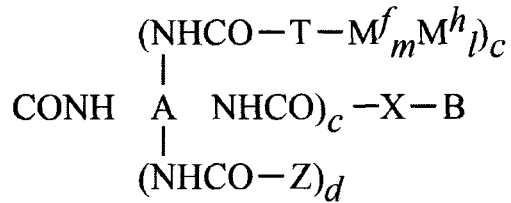 --, therefor.

Column 31-32

Line 32-38; Claim 3, delete " 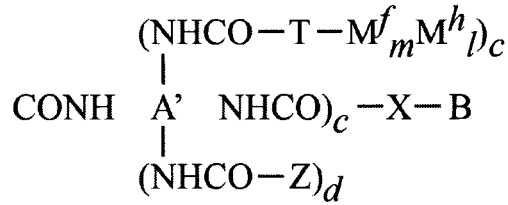 " and insert -- 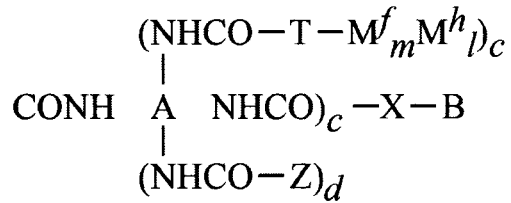 --, therefor.

Column 32
Line 3; Claim 3, delete "polyreuthane" and insert -- polyurethane --, therefor.
Line 46; Claim 4, delete "di- tri-" and insert -- di-, tri- --, therefor.

Column 34
Line 12; Claim 5, delete "di- tri-" and insert -- di-, tri- --, therefor.
Line 19; Claim 5, delete "polyreuthane" and insert -- polyurethane --, therefor.